United States Patent
Walter et al.

(10) Patent No.: US 9,501,537 B2
(45) Date of Patent: Nov. 22, 2016

(54) PARALLEL DISPLAY OF MULTIPLE QUERY RESULTS

(71) Applicants: Wolfgang Walter, Walldorf (DE); Joerg von Duhn, Walldorf (DE)

(72) Inventors: Wolfgang Walter, Walldorf (DE); Joerg von Duhn, Walldorf (DE)

(73) Assignee: SAP SE, Walldorf (DE)

( * ) Notice: Subject to any disclaimer, the term of this patent is extended or adjusted under 35 U.S.C. 154(b) by 61 days.

(21) Appl. No.: 13/687,814

(22) Filed: Nov. 28, 2012

(65) Prior Publication Data

US 2014/0149391 A1    May 29, 2014

(51) Int. Cl.
 *G06F 17/30* (2006.01)
 *H04W 52/02* (2009.01)

(52) U.S. Cl.
 CPC ...... *G06F 17/30554* (2013.01); *H04W 52/027* (2013.01); *Y02B 60/50* (2013.01)

(58) Field of Classification Search
 CPC ............................ G06F 17/30; G06F 17/3005
 USPC ......................................... 707/705, 706, 707
 See application file for complete search history.

(56) References Cited

U.S. PATENT DOCUMENTS

| | | | |
|---|---|---|---|
| 5,877,804 A * | 3/1999 | Otsuki ............. | G08B 13/19602 348/143 |
| 6,349,291 B1 * | 2/2002 | Varma ............................. | 705/35 |
| 7,707,245 B2 * | 4/2010 | Lunenfeld ..................... | 709/203 |
| 7,895,175 B2 * | 2/2011 | Kumar ........................... | 707/706 |
| 7,970,825 B2 * | 6/2011 | Lunenfeld ..................... | 709/203 |
| 8,073,904 B2 * | 12/2011 | Lunenfeld ..................... | 709/203 |
| 8,106,799 B1 * | 1/2012 | Yang et al. ................... | 341/107 |
| 8,150,846 B2 * | 4/2012 | Kohanim et al. ............. | 707/734 |
| 8,171,079 B2 * | 5/2012 | Lunenfeld ..................... | 709/203 |
| 8,239,451 B1 * | 8/2012 | Lunenfeld ..................... | 709/203 |
| 8,326,924 B1 * | 12/2012 | Lunenfeld ..................... | 709/203 |
| 8,423,611 B1 * | 4/2013 | Lunenfeld ..................... | 709/203 |
| 8,527,587 B1 * | 9/2013 | Lunenfeld ..................... | 709/203 |
| 8,577,881 B2 * | 11/2013 | Kohanim et al. ............. | 707/734 |
| 8,671,140 B2 * | 3/2014 | Lunenfeld ..................... | 709/203 |
| 8,832,186 B2 * | 9/2014 | Lunenfeld ..................... | 709/203 |
| 8,862,576 B2 * | 10/2014 | van Os ......................... | 707/722 |
| 8,930,449 B1 * | 1/2015 | Lunenfeld ..................... | 709/203 |
| 9,002,934 B1 * | 4/2015 | Lunenfeld ..................... | 709/203 |
| 2004/0001629 A1 * | 1/2004 | Arima .................... | G06K 9/033 382/189 |
| 2004/0260692 A1 * | 12/2004 | Brill et al. ....................... | 707/5 |
| 2005/0071698 A1 | 3/2005 | Kangas | |
| 2006/0165040 A1 * | 7/2006 | Rathod et al. ................ | 370/335 |

(Continued)

FOREIGN PATENT DOCUMENTS

EP    1515512 A2    3/2005

OTHER PUBLICATIONS

Extended European Search Report received for European Patent Application No. 13194473.8, mailed on Jun. 27, 2014, 8 pages.

*Primary Examiner* — Baoquoc N To
(74) *Attorney, Agent, or Firm* — Brake Hughes Bellermann LLP

(57) ABSTRACT

A computer program product tangibly embodied on a computer-readable medium includes executable code that, when executed, causes at least one computer system hosting a computer application to provide a memory to store results of multiple queries processed by the computer application and a feeder component in a front end display logic layer of the computer application. The feeder component is configured to read the results of the multiple queries stored in the memory asynchronously and to supply the results of the multiple queries in parallel to respective query result display entities in a user interface of the computer application.

20 Claims, 3 Drawing Sheets

(56) References Cited

U.S. PATENT DOCUMENTS

| | | | |
|---|---|---|---|
| 2007/0061331 A1 | 3/2007 | Ramer et al. | |
| 2007/0066364 A1 | 3/2007 | Gil et al. | |
| 2007/0233692 A1* | 10/2007 | Lisa et al. | 707/10 |
| 2008/0033922 A1* | 2/2008 | Cisler et al. | 707/3 |
| 2008/0114731 A1* | 5/2008 | Kumar | 707/3 |
| 2008/0300967 A1 | 12/2008 | Buckley et al. | |
| 2009/0094211 A1* | 4/2009 | Marvit et al. | 707/3 |
| 2009/0094234 A1* | 4/2009 | Marvit et al. | 707/5 |
| 2009/0171950 A1* | 7/2009 | Lunenfeld | 707/5 |
| 2009/0248828 A1 | 10/2009 | Gould et al. | |
| 2010/0211577 A1* | 8/2010 | Shimizu et al. | 707/752 |
| 2010/0223134 A1* | 9/2010 | Lunenfeld | 705/14.54 |
| 2010/0306249 A1* | 12/2010 | Hill et al. | 707/769 |
| 2011/0093491 A1* | 4/2011 | Zabback et al. | 707/769 |
| 2011/0167058 A1* | 7/2011 | van Os | 707/722 |
| 2011/0258080 A1* | 10/2011 | Lunenfeld | 705/26.61 |
| 2012/0066200 A1* | 3/2012 | Lunenfeld | 707/709 |
| 2012/0078897 A1* | 3/2012 | Kohanim et al. | 707/734 |
| 2012/0191689 A1* | 7/2012 | Lunenfeld | 707/707 |
| 2012/0303605 A1* | 11/2012 | Lunenfeld | 707/707 |
| 2013/0031088 A1* | 1/2013 | Srikrishna et al. | 707/722 |
| 2013/0034301 A1* | 2/2013 | Cosatto et al. | 382/173 |
| 2013/0097230 A1* | 4/2013 | Lunenfeld | 709/203 |
| 2013/0238586 A1* | 9/2013 | Lunenfeld | 707/707 |
| 2014/0019432 A1* | 1/2014 | Lunenfeld | 707/706 |
| 2014/0188836 A1* | 7/2014 | Lunenfeld | 707/707 |
| 2014/0379474 A1* | 12/2014 | Lunenfeld | 705/14.54 |

* cited by examiner

210
Providing a shared memory to store data results of multiple queries for a computer application, the computer application having a front end layer with functionality supporting a user interface and a separate back end layer with functionality supporting query functions

220
Providing a front end component or process that is configured to read the shared memory asynchronously and to provide retrieved data results of the multiple queries to corresponding query display components in the user interface for display in parallel

222 configuring the front end layer component with logic to read data asynchronously

224 configuring the front end layer component to supply data to a particular query result display entity in the user interface of the computer application as soon as data for that particular query result display entity becomes available in the memory

226 implementing the front end layer component as a custom feeder class

230
Coupling the front end layer component to a ping mechanism to help determine latency or delay in a connection to the memory

240
Implementing the front end layer component as a single class with individual instantiations for each of the multiple query result display entities in the user interface of the computer application

200
FIG. 2

PARALLEL DISPLAY OF MULTIPLE QUERY RESULTS

TECHNICAL FIELD

This description relates to information retrieval queries and the presentation of query results.

BACKGROUND

Example computer applications are the so-called "business applications." A business application may be any software or set of computer programs that are used by business users to perform various business functions by processing and analyzing data stored in databases. Available business applications relate to different business functions including, for example, customer relationship management, enterprise asset management, enterprise resource planning, financials, human capital management, procurement, product lifecycle management, supply chain management, and sustainability, etc. Other business applications may relate to functions such as business intelligence, data warehousing, enterprise information management, enterprise performance management, governance, risk, and compliance.

Business applications may be interactive. A business application may provide a user interface (UI) through which a user can query data and view query results. A user's queries may be directed to diverse or large databases (e.g., business information warehouses). Use of some business applications (e.g., business analytics applications) may involve numerous queries and extensive query data analysis and processing. As today's computing environments evolve, business applications are becoming more and more complex. In a distributed environment, business applications critical to an enterprise may be spread across multiple systems and access multiple databases. At least in large system implementations, query result display processes may be relatively slow.

Consideration is now being given to aspects of displaying query results to users.

SUMMARY

In a general aspect, a user interface (UI) of a computer application (e.g., a business application) is configured or constructed to receive and display multiple query results in parallel.

In an aspect, the UI is configured or constructed block-by-block or element-by-element using design tools of a web application user interface technology (e.g., Web Dynpro for Java, or Web Dynpro ABAP, etc.) that are available commercially. The UI is supported by display logic and processes in a front end layer of the computer application. A separate back end layer of the computer application includes business logic, persistence of business objects, and processes to support functions (queries, report generation, analytics, etc.) of the computer application.

In an aspect, the computer application is configured to receive and store multiple query results in a shared memory. Both front end processes in the front end layer and back end processes in the back end layer of the computer application can independently access and retrieve the multiple query results stored in the shared memory via a service (e.g., an RFC service).

In a general aspect, the front end layer includes a "parallel" feeder functionality or process (e.g., a feeder component) that is configured to asynchronously read the multiple query results stored in the shared memory and to supply the read query results in parallel to a plurality of UI query result display entities.

In an aspect, the parallel feeder functionality or process for reading query results data in parallel is implemented centrally as a custom feeder class with logic to read data in the shared memory asynchronously. The custom feeder class logic can be coupled to a "ping" mechanism which can help determine latency or delay in the service connection to the shared memory. The custom feeder class may be configured so that after the process of reading query result data from shared memory is complete, the custom feeder class makes the read data available to the front end UI.

In a general aspect, a method is provided for displaying multiple query results in parallel on a user interface (UI) of a computer application. The computer application (e.g., a business application) may include a front end layer with functionality or processes supporting the UI and a separate back end layer with functionality or processes supporting application functions (e.g., business functions). The method includes providing a shared memory to store data results of multiple queries, and providing a front end component or process that is configured to asynchronously read the shared memory to retrieve the data results of the multiple queries as they become available. The front end component or process is configured to provide the retrieved data results of the multiple queries to respective query display entities in the user interface for display in parallel.

In a general aspect, a system includes at least one processor configured to execute database queries for a computer application and a user interface having a plurality of query display elements. Each query display element is configured to display data results of a respective query. The system further includes a memory configured to store data results of multiple queries for the computer application, and a feeder class component installed in a front end of the computer application. The feeder class component is configured to retrieve the data results of multiple queries from the shared memory asynchronously and to provide the retrieved data results of the multiple queries to corresponding query display elements in the user interface for display in parallel. The feeder class component is configured to supply data to a particular query display element in the user interface of the computer application as soon as data for that particular query display element becomes available in the memory.

The details of one or more implementations are set forth in the accompanying drawings and the description below. Other features will be apparent from the description and drawings, and from the claims.

BRIEF DESCRIPTION OF THE DRAWINGS

FIG. 2 is an illustration of an example method for displaying multiple query results on a user interface of a computer application in parallel, in accordance with the principles of the present disclosure.

Like reference symbols in the various drawings indicate like elements.

DETAILED DESCRIPTION

Figure 1:
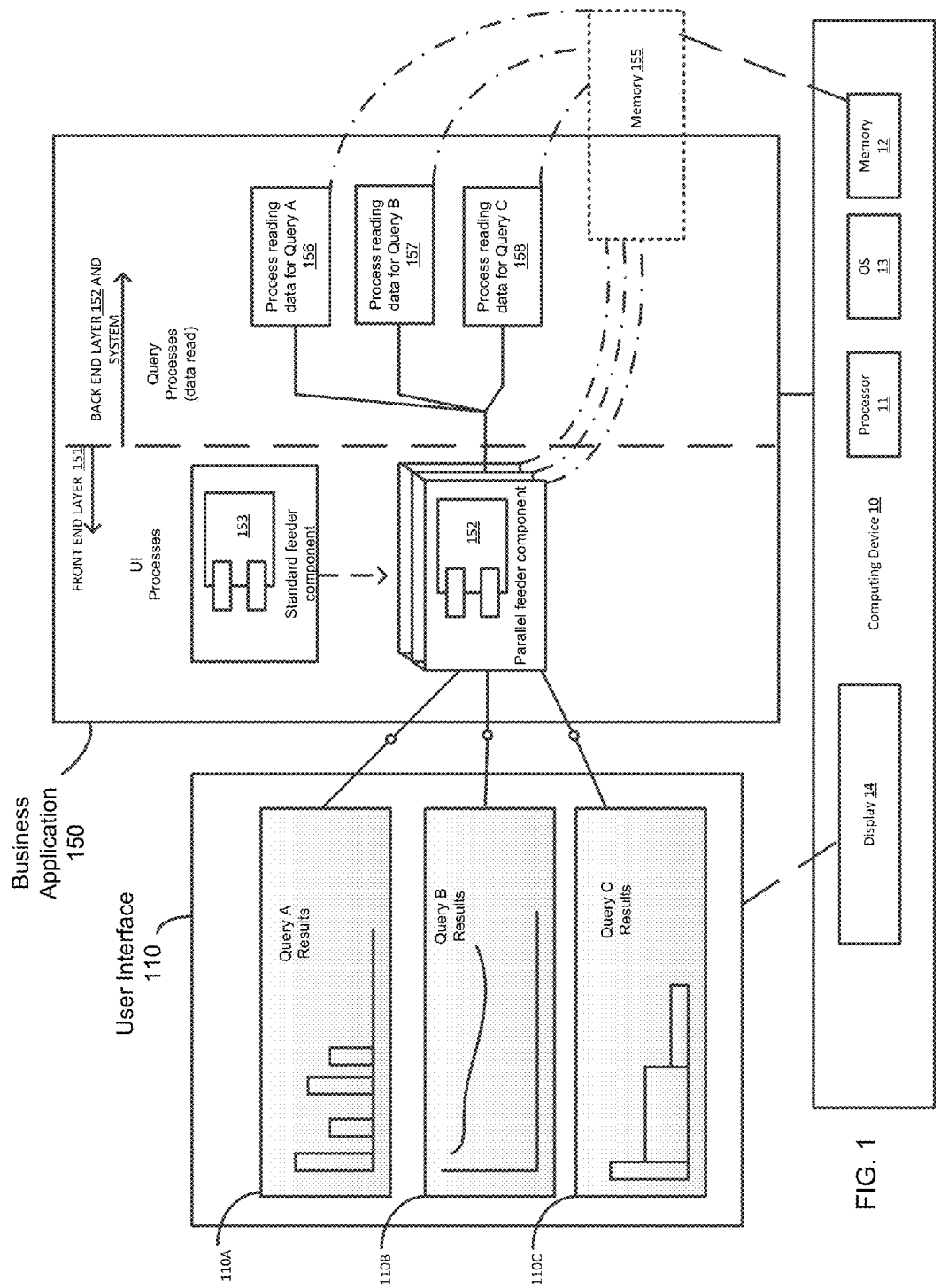
FIG. 1 is a schematic illustration of a system including an example user interface (UI) of a computer application. The UI is configured to display multiple query results in parallel, in accordance with the principles of the present disclosure.

A user interface (UI) of a computer application (e.g., a business application) is configured or constructed to receive and display multiple query results in parallel, in accordance with the principles of the disclosure herein. The queries may, for example, be "BW" queries directed to business information warehouses or databases.

The UI, which may be a web-based user interface, may be configured or constructed block-by-block or element-by-element using design tools of a web application user interface technology. For purposes of illustration, the configuration or construction the UI may be described herein with reference to example web application user interface technologies (e.g., Web Dynpro for Java, or Web Dynpro ABAP, etc.) that are developed and made available commercially by the assignee. However, it will be understood that configuration or construction of the UI of the present disclosure is not limited to the particular example web application user interface technologies named herein, but may be implemented for any computer application with other available UI design tools or technologies.

Further, for convenience in description herein, the following terminology relevant to Web Dynpro may be adopted herein:

Web Dynpro—Web Dynpro is a client-independent programming model (based on a Model-View-Controller paradigm) for developing user interfaces for web based business applications. The model provides a clear separation of business logic and display logic. A Web Dynpro application runs on the front end and has local or remote access to the back end system via a service. This means that the display logic is contained in the Web Dynpro application, while the business logic and the persistence of the business objects run in the back end system.

Floorplan Manager (FPM)—a Web Dynpro Advanced Business Application Programming (ABAP) application that provides a framework for developing new Web Dynpro ABAP application interfaces View—is the central logical layout element in the Web Dynpro application. It is responsible for the presentation logic and for the browser layout.

Controller—active part of Web Dynpro application, handles the data flow between the model and the view in both directions.

Model—is the interface to the back end system and is responsible for providing data to the entire application. The model represents the data in the back end.

Component—Reusable UI program package, which mostly contains views and often uses models. A component communicates with other components via component interfaces.

Generic User Interface Building Blocks (GUIBBs)—Web Dynpro standard UI components (e.g., Composite Component, Form Component, Form GL2 Component, Form Repeater Component, Hierarchical List (Tree) Component, Launchpad Component, List ATS Component, Personal Object Worklist (POWL) Component, Search Component, Tabbed Component, etc.).

Feeder class—A feeder class is an objects class, based on a specific interface (IF_FPM_GUIBB). A feeder class provides a link between the application and a GUIBB. Feeder class implementations are based on a predefined interface definition, providing all necessary methods and corresponding signatures to standardize the communication between the application and the GUIBB. Feeder classes may, for example, include classes for form components, form repeater components, list components, search components, hierarchical list components, launch pad components, etc. Using a GET_DEFINITION method, the feeder class defines the field catalog (the fields that are available for use in the configuration) of the component and supplies the component at runtime with data from the application using the GET_DATA method.

Web Dynpro Application—Something runnable (from client application, i.e. web browser) Running a Web Dynpro application means starting a component, navigating to an initial view in an initial window.

FIG. 1 shows an example user interface (UI) 110 of a computer application (e.g., business application 150), which is configured to display multiple query results in parallel, in accordance with the principles of the present disclosure. The computer application may be configured, for example, to run user queries (e.g., Query A, Query B, and Query C) on one or more databases (not shown) and display results of the queries on UI 110.

UI 110 may, for example, be constructed using standard components (e.g., GUIBBs) and/or custom-developed components for UI display entities (e.g., graphics, charts, lists, forms, trees, etc.), which can be used to display data. In the example shown in FIG. 1, UI 110 may, for example, include three GUIBB graphics or chart entities 110A, 110B, and 110C for displaying data results of Query A, Query B, and Query C, respectively.

UI 110 may be at a front end of business application 150, which may be hosted, for example, on one or more computer systems in a distributed network of computing systems. For visual clarity, all of the various possible components (e.g., databases, network connections, servers, etc.) of the distributed network of computing systems hosting business application 150 are not shown in FIG. 1. Instead, business application 150 is shown simply as being hosted on a representative computing device 10 (which includes a processor 11, a memory 12, an O/S 13, and a display 14).

Business application 150 may include a front end layer 151 and a back end layer 152. Front end layer 151 may include display logic and processes (e.g., in a Web Dynpro application) to support UI 110. Back end layer 152 may include business logic, persistence of business objects, and processes to support business functions (queries, report generation, analytics, etc.) of business application 150. Back end layer 152 may be configured to process multiple user-submitted queries and retrieve multiple query results from one or more databases (e.g., a business warehouse (BW)). Back end layer 152 may further be configured to store the multiple query results in a shared memory 155 in a back end system (e.g., a back end ABAP server, computing device 10, or a computing cloud, etc.). Business application 150 may be configured so that both front end processes in front end layer 151 and back end processes in back end layer 152 can independently have local or remote access to the multiple query results stored in shared memory 155 via a service (e.g., a RFC service).

With respect to access to the multiple query results stored in shared memory 155, back end layer 152 may, for example, include data read processes 156, 157 and 158 to retrieve results of Query A, Query B and Query C, respectively. Data read processes 156, 157 and 158 may retrieve the query results for use or processing in business application functions in back end layer 152 independent of any UI display requirements.

Front end layer 151 may in particular include a "parallel" feeder functionality or process (e.g., feeder component 152) that is configured to read query results data stored in shared memory 155 and supply the read query results data in parallel to a plurality of display entities (e.g., entities 110A, 110B, and 110C) in UI 110. The parallel feeder process may be configured to supply data to a particular entity of the plurality of display entities in UI 110 as soon as data for that particular entity becomes available (e.g., in shared memory 155) without regard to the order of the plurality entities in UI 110. By parallelization of the data supply to UI 110, each query result data graphic may be loaded for display (e.g., on entities 110A, 110B, and 110C) as soon as the relevant data becomes available. For example, a display graphic for Query C results may start loading in entity 110C even as a display graphic for Query A results may be loading in entity 110A.

The data supply behavior of the parallel feeder process described above may be contrasted with the data supply behavior of a standard Web Dynpro ABAP feeder component (e.g., ABAP feeder component 153) which supplies data to UI entities one at a time. In the case of the standard ABAP feeder component 153, UI 110 entities (e.g., entities 110A, 110B, and 110C) can be populated only serially or sequentially.

In an example implementation of front end layer 151 in an ABAP system, the parallel feeder functionality or process (e.g., feeder component 152) for reading query results data in parallel may be implemented centrally as a custom feeder class. This custom feeder class may be an ABAP Object Oriented class, which may inherit or reuse some of its functions from an existing standard basis class. The existing standard basis class (e.g., ABAP feeder component 153) may always read data serially or sequentially. However, the custom feeder class of the present disclosure may be new feeder class configured to implement logic to read data asynchronously (or in parallel) by a separate process than the existing standard basis class. The logic to read the query result data in the shared memory asynchronously (or in parallel) may be coupled to a "ping" mechanism which may, for example, help determine latency or delay in the connection to the shared memory. After the process of reading query result data from shared memory is complete, the custom feeder class may provide the read data to the front end UI.

The custom feeder class (e.g., feeder component 152) for reading data in parallel may be instantiated individually for each display entity or component in the UI. Thus, "n" charts in UI 110 may correspond to n feeder instances. However, it will be understood that the n feeder instances are still only one class.

The logic of the custom feeder class (e.g., feeder component 152) may be configured to be independent of any application (e.g., business application) specific functionality. This independence may allow the custom feeder class (e.g., feeder component 152) to be deployed as reusable component in diverse computer applications.

FIG. 2 is a flowchart illustration of an example method 200 for displaying multiple query results in parallel on a user interface (UI) of a computer application, in accordance with the principles of the present disclosure. The computer application (e.g., a business application) may include a front end layer with functionality or processes supporting the UI and a separate back end layer with functionality or processes supporting application functions (e.g., specific business functions, queries, reports, etc.).

Method 200 includes providing a shared memory to store data results of multiple queries (210), and providing a front end component or process that is configured to read the shared memory asynchronously to retrieve the data results of the multiple queries and to provide the retrieved data results of the multiple queries to corresponding query display components in the user interface in parallel (220). Method 200 may include providing services to access the memory storing the data results of multiple queries from both the front end layer and the back end layer.

In method 200, providing a front end component or process to provide the retrieved data results of the multiple queries to corresponding query display components in the user interface in parallel 220 may include configuring the front end layer component with logic to read data asynchronously (222) and configuring the front end layer component to supply data to a particular query result display entity in the user interface of the computer application as soon as data for that particular query result display entity becomes available in the memory (224).

Providing a front end component or process 220 may further include implementing the front end layer component as a custom feeder class (226). In instances in which at least one computer system hosting the computer application is an ABAP system, implementing the front end layer component as a custom feeder class 226 may include implementing the custom feeder class as an ABAP Object Oriented class. The custom feeder class may be configured to inherit one or more functions from a standard ABAP feeder basis class.

Method 200 may further include coupling the front end layer component to a ping mechanism to help determine latency or delay in a connection to the memory (230) and implementing the front end layer component as a single class with individual instantiations for each of the multiple query result display entities in the user interface of the computer application (240).

Figure 3:
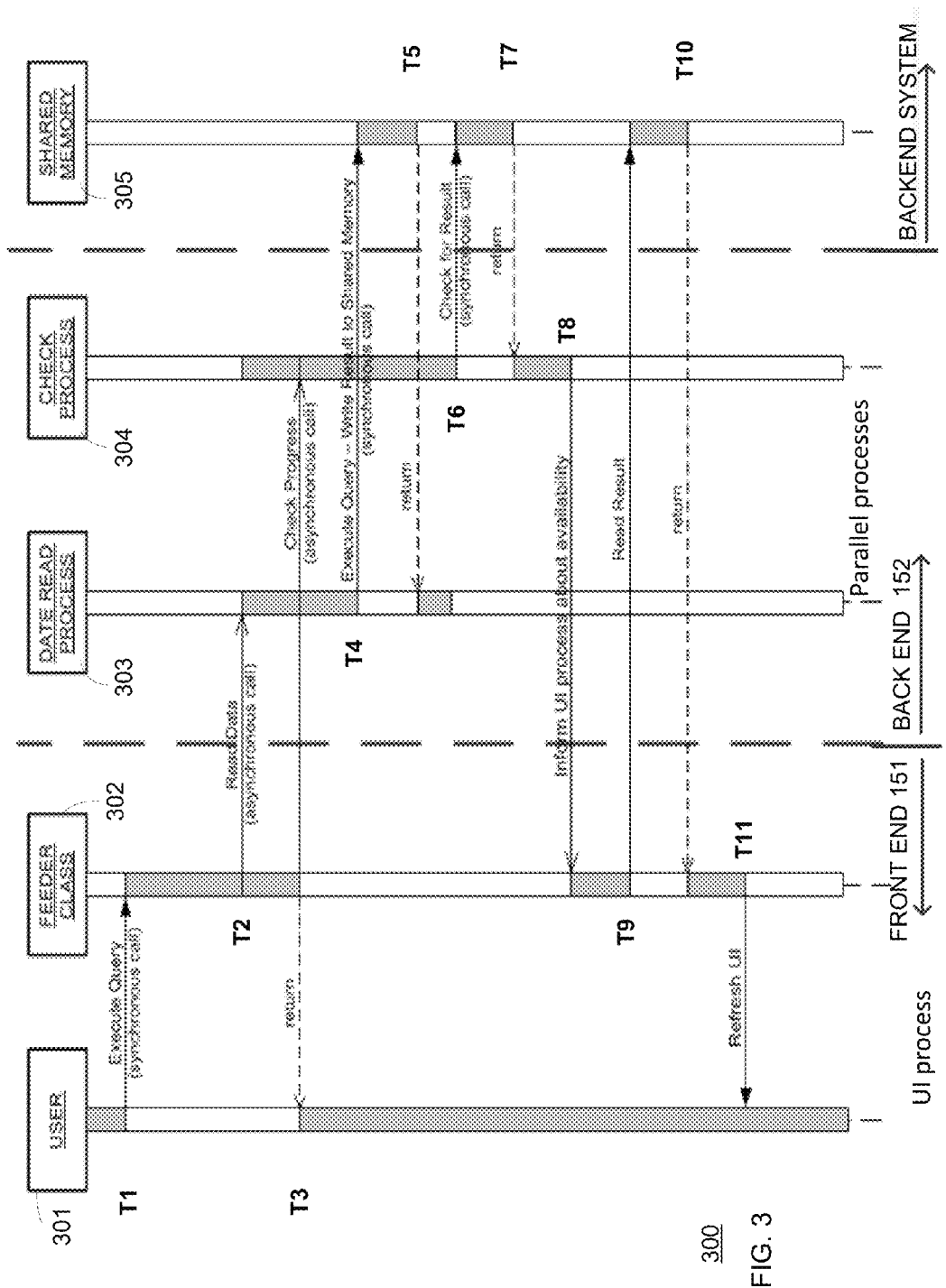
FIG. 3 is a sequence diagram which illustrates operation of the system of FIG. 1 for displaying multiple query results on a user interface of a computer application in parallel, in accordance with the principles of the present disclosure.

FIG. 3 is a sequence diagram which illustrates a sequence 300 in the operation of the system of FIG. 1, in accordance with the principles of the present disclosure. Sequence 300 shows interactions between actors/objects in the front end (e.g., front end 151) and the back end (e.g., back end 152) of a computer application and the backend system, which may be involved in displaying multiple query results on the user interface of the computer application. In particular, sequence 300 shows interactions between actors/objects: a User 301 (e.g., UI 110), a Feeder Class 302 (e.g., component 152), a Data Read Process 303 (e.g., data read process 156-158), a Check Processes 304 (e.g., a ping mechanism) and a Shared Memory 305 (e.g., memory 155).

In sequence 300 at about time T1, User 301 may (e.g., via user interface 110) submit or trigger one or more queries (i.e., definition of selection or search criteria) that may provide data input for one or more display entities or charts (e.g., 110A, 110B, 110C) in UI 110. For visual clarity, only one user-submitted Execute Query action is shown in the figure as representative of the multiple queries that may provide data input for the one or more display entities or charts in UI 110. The subsequent actions or steps in sequence 300 shown in FIG. 3 will be understood to be executed per query and corresponding chart. Further, while the subsequent actions or steps are shown in the figure as occurring at separate times (i.e. T2 to T11) for visual clarity, it will be understood that two or more of the subsequent steps or actions may occur at the same or overlapping times in parallel.

In sequence 300. the user-submitted query at time T1 may be received by Feeder Class 302 (e.g., feeder component 152) via a synchronous call as an instruction to execute a query. Feeder Class 302 in the front end may then via asynchronous calls (i.e. without waiting for a response) to the back end initiate a Read Data task and a Check Progress task. The Read Data task may be a request to query/read data directed to Data Read Process 303 in the back end; the Check Progress task may be a supervisor/check task directed to Check Process 304 in the back end that constantly checks whether the first task has finished the data read (e.g., by a ping request).

Data Read Process 303 in the back end may respond to the Read Data task by executing or processing the query (e.g., by querying the data in a BW database) and writing the result to Shared Memory 305 via a synchronous call (Execute Query—Write Result to Shared Memory). In practical scenarios, depending on data volume, selection parameters etc., processing the query and writing the query results data to Shared Memory 305 may take from less than a second up to several minutes.

Check Process 304 in the back end may respond to the Check Progress supervisor/check task process initiated by Feeder Class 302 by constantly checking with Shared Memory 305 via a Check for Result synchronous call to determine if query results are available. If the query results are available in Shared Memory 305, Check Process 304 may inform UI processes in the front end (i.e. Feeder Class 302) of the availability of the query results. The Check Progress supervisor/check task process initiated by Feeder Class 302 may also responsible to identify "timeouts" i.e. if the Data Read Process fails or surpasses a defined time limit, the Check Progress supervisor/check task process may inform the UI process (e.g., Feeder Class 302) of the non availability of the query results. In typical scenarios, the Check Progress supervisor/check task process (which may run in parallel with the Execute Query—Write Result to Shared Memory process) may have to check the shared memory several times before the query results data becomes available from the Execute Query—Write Result to Shared Memory process.

After Feeder Class 302 receives acknowledgment or information that the query results data is available in Shared Memory 305, it may initiate a Read Result process to retrieve the query results data from Shared Memory 305. Further, after retrieving query results data, Feeder Class 302 may update or refresh the data input for the corresponding display entity or chart in UI 110.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (e.g., a computer-readable medium), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
   at least one processor configured to execute queries for a computer application having a back end business logic layer separate from a front end display logic layer, each of the queries being a query received by the computer application and being directed from the back end business logic layer of the computer application to business information warehouses or databases;
   a user interface including a plurality of query display elements, each query display element configured to display data results of a respective query;

a memory configured to individually store, query-by-query, data results of multiple queries directed from the back end business logic layer of the computer application to the business information warehouses or databases; and a parallel feeder component installed in the front end display logic layer of the computer application, wherein the parallel feeder component is configured with logic to retrieve, query-by-query, the individually stored data results of the multiple queries from the shared memory asynchronously or in parallel, and to supply the retrieved individually stored data results of the multiple queries concurrently in parallel to a corresponding multiplicity of query display elements in the user interface for display, and wherein the parallel feeder component is implemented as a custom feeder class in contrast to a standard feeder basis class that always reads data serially or sequentially and can populate multiple display entities only serially or sequentially.

2. The system of claim 1, wherein the parallel feeder component is configured to supply data to a particular query display element in the user interface of the computer application as soon as data for that particular query display element becomes available in the memory.

3. The system of claim 1, wherein the custom feeder class logic is configured to be independent of all specific functionalities of the computer application.

4. A method, comprising:

providing a shared memory to individually store data results of multiple queries for a computer application, each of the multiple queries being a query received by the computer application directed to business information warehouses or databases, the computer application having a front end display logic layer with functionality supporting a user interface and a separate back end layer with functionality supporting query functions; and providing a parallel feeder component in the front end display logic layer that is configured with logic to retrieve, query-by-query, the individually stored data results of the multiple queries from the shared memory asynchronously or in parallel, and to supply the retrieved individually stored data results of the multiple queries in parallel to a corresponding multiplicity of query display components in the user interface for display, the parallel feeder component being implemented as a custom feeder class in contrast to a standard feeder basis class that always reads data serially or sequentially and can populate multiple display entities only serially or sequentially.

5. The method of claim 4 further comprising providing a service to access the memory storing the data results of multiple queries from the front end display logic layer.

6. The method of claim 4, wherein providing a parallel feeder component in the front end display logic layer includes configuring the parallel feeder component to supply data to a particular query result display entity in the user interface of the computer application as soon as data for that particular query result display entity becomes available in the memory.

7. The method of claim 4, wherein at least one computer system hosting the computer application is an Advanced Business Application Programming (ABAP) system, and wherein implementing the parallel feeder component as a custom feeder class includes implementing the custom feeder class as an ABAP Object Oriented class.

8. The method of claim 4, wherein implementing the parallel feeder component as a custom feeder class includes configuring the custom feeder class to inherit one or more functions from a standard Advanced Business Application Programming (ABAP) feeder basis class.

9. The method of claim 4, wherein providing a parallel feeder component in the front end display logic layer includes configuring the parallel feeder component with logic to read data asynchronously.

10. The method of claim 4, wherein providing a parallel feeder component in the front end display logic layer includes coupling the custom feeder class to a ping mechanism to help determine latency or delay in a connection to the memory.

11. The method of claim 4, wherein providing a parallel feeder component in the front end display logic layer includes implementing the parallel feeder component as a single class with individual instantiation for each query result display entity in the user interface of the computer application.

12. A non-transitory computer-readable storage medium including executable code that, when executed, is configured to cause at least one computer system to host a computer application having a back end business logic layer separate from a front end display logic layer in the computer application and to provide:

a memory to store, query-by-query, individual results of multiple queries directed to business information warehouses or databases by the back end business logic layer of the computer application, each of the multiple queries being a query received by the computer application; and a parallel feeder component in a front end display logic layer of the computer application, the parallel feeder component being configured with logic to read the individual results of the multiple queries stored in the memory asynchronously or in parallel, and to supply the read individual results of the multiple queries in parallel to a corresponding multiplicity of query result display entities in a user interface of the computer application, wherein the parallel feeder component is implemented as a custom feeder class in contrast to a standard feeder basis class that always reads data serially or sequentially and can populate multiple display entities only serially or sequentially.

13. The non-transitory computer-readable storage medium of claim 12, wherein both the back end business logic layer and the front end display logic layer have access via a service to the memory storing the individual results of multiple queries.

14. The non-transitory computer-readable storage medium of claim 12, wherein the parallel feeder component is configured to asynchronously read, query-by-query, the individual results of the multiple queries stored in the memory, and to supply data to a particular query result display entity in the user interface of the computer application as soon as data for that particular query result display entity becomes available in the memory.

15. The non-transitory computer-readable storage medium of claim 12, wherein the at least one computer system hosting the computer application is an Advanced Business Application Programming (ABAP) system, and wherein the custom feeder class is an ABAP Object Oriented class.

16. The non-transitory computer-readable storage medium of claim 15, wherein the custom feeder class inherits one or more functions from a standard Advanced Business Application Programming (ABAP) feeder basis class.

17. The non-transitory computer-readable storage medium of claim 16, wherein the standard ABAP feeder basis class reads data sequentially and the custom feeder class in contrast implements logic to read data asynchronously.

18. The non-transitory computer-readable storage medium of claim 12, wherein the custom feeder class is coupled to a ping mechanism to help determine latency or delay in a connection to the memory.

19. The non-transitory computer-readable storage medium of claim 12, wherein the custom feeder class is implemented as a single class with individual instantiation for each query result display entity in the user interface of the computer application.

20. The non-transitory computer-readable storage medium of claim 12, wherein the custom feeder class logic is configured to be independent of all specific functionalities of the computer application.

\* \* \* \* \*